United States Patent Office 3,763,160
Patented Oct. 2, 1973

3,763,160
PHOSPHORUS-CONTAINING ESTERS OF 2-HYDROXYQUINOXALINE
Karl-Julius Schmidt, Wuppertal-Vohwinkel, and Ingeborg Hammann, Cologne, Germany, assignors to Bayer Aktiengesellschaft, Leverkusen, Germany
No Drawing. Filed May 20, 1966, Ser. No. 551,553
Claims priority, application Germany, May 26, 1965, F 46,162
Int. Cl. C07d 51/78
U.S. Cl. 260—250 R
10 Claims

ABSTRACT OF THE DISCLOSURE

Phosphoric, thionophosphoric, phosphonic, and thionophosphonic acid esters of 2-hydroxyquinoxaline of the formula

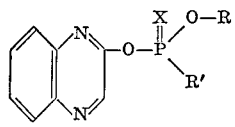

in which R is alkyl, R' is alkyl, alkoxy or phenyl (said alkyl and alkoxy having 1 to 4 carbon atoms), and X is oxygen or sulfur, which possess pesticidal, especially insecticidal and acaricidal, properties and which may be produced by reacting 2-hydroxyquinoxaline with the corresponding phosphorus-containing ester halide.

---

The present invention relates to particular new phosphorus-containing esters of 2-hydroxyquinoxaline, which have pesticidal, and especially insecticidal and acaricidal, properties, to their pesticidal compositions with dispersible carrier vehicles, and to methods for the preparation and use thereof.

Open chain and cyclic quinoxaline-2,3-thiophosphoric acid esters are already known from German Pat. No. 1,115,738. These products are obtained by reacting the corresponding 2,3-dimercaptoquinoxalines with alkyl- or aryl-phosphoric or -thionophosphoric acid monoester dihalides or diester monohalides.

According to said German patent, the compounds in question are characterized by a good insecticidal and acaricidal activity; they have an especially strong action against resistant spider mites. However, the production of this group of active compounds is comparatively difficult, at least on an industrial scale.

It is an object of the present invention to provide particular new phosphorus-containing esters, such as phosphoric, thionophosphoric, phosphonic, and thionophosphonic acid esters of 2-hydroxyquinoxaline, which possess valuable pesticidal, and especially insecticidal and acaricidal, activity; to provide active compositions in the form of mixtures of such compounds with solid and liquid dispersible carrier vehicles; to provide a process for producing such compounds; and to provide methods of using such compounds in a new way, especially for combating pests, such as insects and acarids, and the like.

Other and further objects of the present invention will become apparent from a study of the within specification and accompanying examples.

It has now been found, in accordance with the present invention, that phosphoric, thionophosphoric, phosphonic, and thionophosphonic acid esters of 2-hydroxyquinoxaline having the formula

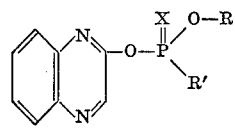

in which R is alkyl having 1 to 4 carbon atoms, R' is a member selected from the group consisting of alkyl having 1 to 4 carbon atoms, lower alkoxy, and phenyl, and X is selected from the group consisting of oxygen and sulfur, possess strong pesticidal, and especially insecticidal and acaricidal, properties.

It has been further found in accordance with the present invention that the particular new phosphorus-containing compounds of Formula I above may be produced by a process which comprises reacting 2-hydroxyquinoxaline having the formula

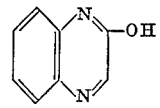
(IIa)

with phosphorus-containing ester halides having the formula

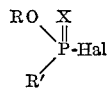
(IIb)

in which R, R' and X are the same as defined above, and Hal is a halogen atom, including chlorine, bromine, fluorine, and iodine, and especially chlorine.

Advantageously, the particular new compounds of General Formula I have strong arthropodicidal, i.e., insecticidal and acaricidal, properties, such as for instance an excellent activity against eating and sucking insects, as well as an outstanding activity against spider mites and ticks. The particular new compounds according to the present invention are, in this respect, superior to the known products of analogous constitution and having the same type of activity; therefore they constitute a genuine enrichment of the art.

The process for producing the particular new compounds of the present invention takes place according to the following equation:

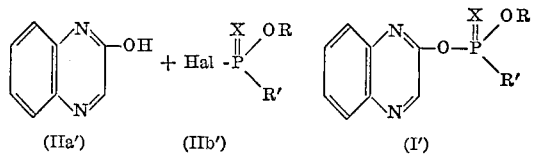

(IIa')   (IIb')   (I')

In such equation, R, R', X and Hal have the same meanings as defined above.

The process according to the present invention is preferably carried out with the concurrent use of suitable solvents or diluents. Practically all inert organic solvents or mixtures thereof can be used for this purpose, such as optionally halogenated hydrocarbons, for example, benzine, benzene, toluene, chlorobenzene and xylene; ethers, for example, diethyl ether, dibutyl ether and dioxan; and ketones, for example, acetone, methyl ethyl ketone, methyl isopropyl ketone and mehyl isobutyl ketone. However, low boiling aliphatic alcohols, for example, methanol or ethanol, and, in particular, nitrile, for example, acetonitrile and propionitrile, as well as dimethyl formamide, have proved to be especially suitable for this purpose.

Further, the reaction according to the present invention is preferably carried out in the presence of acid acceptors. Practically all customary acid-binding agents can be used for this purpose. Alkali metal alcoholates and carbonates, such as potassium and sodium methylate and ethylate, and sodium and potassium carbonate, as well as tertiary aliphatic, N-aliphatic-N-aromatic and heterocyclic amines, for example, triethylamine, dimethyl aniline and pyridine, have proved especially useful.

The reaction temperature may be varied within a fairly wide range. In general, the reaction is carried out substantially between about 20 and 120° C. (or the boiling point of the reaction mixture), preferably at 40 to 80° C.

The starting materials and the auxiliaries (acid-binding agents) are generally used in stoichiometric quantities. After the starting components have been mixed together, it is advantageous to continue heating the reaction mixture for some time (about 1 to 3 hours), possibly with stirring, in order to complete the reaction. By this method, the products of the present process are obtained in excellent yields and with a high degree of purity.

Some of the esters according to the present invention are colorless crystals with a sharp melting point; if necessary, these can easily be further purified by recrystallization from conventional solvents. In most cases, however, the compounds are colorless to yellow colored, viscous, water-insoluble oils which cannot be distilled without decomposition but which can be freed from the last volatile components and purified in this way by a so-called "partial distillation," i.e. by prolonged heating at moderately elevated temperatures under reduced pressure. Determination of the refractive index may serve for a more specific characterization.

As has already been mentioned above, the products of the present process are characterized by an outstanding insecticidal and acaricidal activity. At the same time, they have only a low toxicity towards warm-blooded animals and a low phytotoxicity. The effect appears rapidly and is long-lasting. The compounds according to the present invention can, therefore, be used with good results in plant protection for combating noxious sucking and eating insects and Diptera and in this field, as well as in veterinary medicine, against mites (Acarina). The excellent activity of the particular new compounds against strains of spider mites which are resistant to phosphoric acid esters is to be especially emphasized.

The sucking insects contemplated herein essentially include aphids, such as the peach aphid (*Myzus persicae*) and the black bean aphid (*Doralis fabae*); coccids, such as *Aspidiotus hederae*, *Lecanium hesperidum* and *Pseudococcus maritimus*; Thysanoptera, such as *Hercinothrips femoralis*; and bugs, such as the beet bug (*Piesma quadrata*) and the bed bug (*Cimex lectularius*); and the like.

The eating insepcts contemplated herein essentially include butterfly larvae, such as *Plutella maculipennis* and *Lymantria dispar*; beetles, such as grain weevils (*Sitophilus granarius*) and the Colorado beetle (*Leptinotarsa decemlineata*); and also species living in the soil, such as wire worms (*Agriotes sp.*) and cockchafer larvae (*Mololontha melolontha*); cockroaches, such as the German cockroach (*Blatella germanica*); Orthoptera, such as the cricket (*Gryllus domesticus*); termites, such as Recticulitermes; and Hymenoptera, such as ants; and the like.

The Diptera contemplated herein mainly comprise the flies, such as the fruit fly (*Drosophila melanogaster*), the Mediterranean fruit fly (*Ceratitis capitata*) and the house fly (*Musca domestica*); gnats, such as the mosquito (*Aedes aegypti*); bluebottle flies, such as the gold fly (*Lucilia sericata*); and blowflies (*Chrysomya chloropyga*); and the like.

Among the mites contemplated herein, the spider mites (Tetranychidae) are of special importance, such as the common spider mite (*Tetranychus urticae*) and the fruit tree spider mite (*Paratetranychus pilosus*); gall mites, such as the red currant gall mite (*Eriophyes ribis*) and tarsonemides, such as *Tarsonemus pallidus*; and also ticks, such as *Boöphilus microplus* and scrab mites; and the like.

Advantageously, the active compounds according to the present invention are equally suitable as insecticides and acaricides in plant protection and also for combating hygiene pests, for example, in homes, stables and store rooms.

Thus, the new compounds of the instant invention can be used as pesticides either alone or in admixture with solid or liquid carriers or diluent.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.000001 and 20%, preferably 0.00001 and 5%, by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.000001 and 95% by weight of the mixture.

Furthermore, the present invention contemplates methods of combating pests, especially insects and acarids, which comprise applying to at least one of (a) such pests and (b) their habitat, a pesticidally, especially insecticidally and/or acaricidally, effective amount of the particular active compound of the invention alone or together with a carrier vehicle, as noted above. The instant formulations or compositions are applied in the usual manner, for example, by spraying, atomizing, scattering, dusting, watering, sprinkling, vaporizing, and fumigating, and the like. It will be realized in accordance with the present invention that the instant compounds may be used effectively not only in plant protection, but also in hygiene control, especially against insects and acarids.

The outstanding pesticidal, and especially insecticidal and acaricidal, activity of the particular new compounds of the present invention can be seen from the following examples:

EXAMPLE 1

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the concentrate is diluted with water to the desired final concentration.

Cabbage plants (*Brassica oleracea*) which have been heavily infested with peach aphids (*Myzus persicae*) are sprayed with the stated preparation of the given active compound until dripping wet.

After the specified period of time, the degree of destruction is determined percentagewise: 100% indicated that all the aphids are killed, whereas 0% indicates that none are killed.

The active compounds, their concentration, the evaluation time and the results obtained can be seen from the following Table 1:

TABLE 1.—PLANT DAMAGING INSECTS

| Active compound | Percent Concentration of active compound | Degree of destruction after 24 hours |
|---|---|---|
| (III) | 0.01 | 100 |
|       | 0.001 | 20 |
| (IV)  | 0.001 | 100 |
| (V)   | 0.001 | 100 |
|       | 0.0001 | 95 |
| (VI)  | 0.1 | 100 |
|       | 0.01 | 98 |
|       | 0.001 | 60 |
| (VII) | 0.1 | 100 |
|       | 0.01 | 100 |
|       | 0.001 | 90 |
| (VIII) | 0.1 | 100 |
|        | 0.01 | 100 |
|        | 0.001 | 100 |
| (IX)  | 0.1 | 100 |
|       | 0.01 | 40 |

(Compound known from U.S. patent specification No. 2,758,135.)

EXAMPLE 2

Tetranychus test

Solvent: 3 parts by weight acetone
Emulsifier: 1 part by weight alkyl aryl polyglycol ether.

To produce a suitable preparation of the particular active compound 1 part by weight of such active compound is mixed with the stated amount of solvent containing the stated amount of emulsifier, and the concentrate is diluted with water to the desired final concentration.

Bean plants (Phaseolus *vulgaris*), which have a height of approximately 10–30 cm., are sprayed with the stated preparation of the given active compound until dripping wet. The bean plants are heavily infested with common spider mites (*Tetranychus urticae*) in all stages of development.

After the specified period of time, the effectiveness of the particular preparation of active compound is determined by counting the dead mites. The degree of destruction is expressed percentagewise: 100% indicates that all the spider mites are killed, whereas 0% indicates that none are killed.

The active compounds, their concentrations, the evaluation time and the results obtained can be seen from the following Table 2:

TABLE 2.—PLANT DAMAGING MITES

| Active compound | Percent Concentration of active compound | Degree of destruction after 48 hours |
|---|---|---|
| (III') | 0.1 | 100 |
|        | 0.01 | 60 |
| (IV')  | 0.1 | 100 |
|        | 0.001 | 40 |
| (V')   | 0.01 | 100 |

TABLE 2—Continued

| Active compound | | Percent Concentration of active compound | Degree of destruction after 48 hours |
|---|---|---|---|
| (XII) | quinoxaline-O-P(=O)(OC₃H₇iso)(OCH₃) | 0.1 / 0.01 | 100 / 90 |
| (VIII') | quinoxaline-O-P(=S)(OC₂H₅)(CH₃) | 0.1 / 0.01 | 100 / 100 |
| (IX') | benzotriazinone-N-CH₂-S-P(=S)(OC₂H₅)₂ | 0.1 / 0.01 | 100 / 0 |

(Compound known from U.S. patent specification No. 2,758,115.)

EXAMPLE 3

Plutella est

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the concentrate is diluted with water to the desired final concentration.

Cabbage leaves (*Brassica oleracea*) are sprayed with the preparation of the given active compound until dew moist, and are then infested with caterpillars of the diamondback moth (*Plutella maculipennis*).

After the specified period of time, the degree of destruction is determined percentagewise: 100% indicates that all of the caterpillars are killed, whereas 0% indicates that none are killed.

The active compounds, their concentrations, the evaluation time and the results obtained can be seen from the following Table 3:

TABLE 3.—PLANT DAMAGING INSECTS

| Active compound | | Percent Concentration of active compound | Degree of destruction after 4 days |
|---|---|---|---|
| (III") | quinoxaline-O-P(=O)(OC₂H₅)₂ | 0.001 / 0.0001 | 100 / 80 |
| (IV") | quinoxaline-O-P(=S)(OC₂H₅)₂ | 0.0001 | 100 |
| (V") | quinoxaline-O-P(=S)(OC₂H₅)(C₂H₅) | 0.0001 / 0.00001 | 100 / 20 |

TABLE 3—Continued

| Active compound | | Percent Concentration of active compound | Degree of destruction after 4 days |
|---|---|---|---|
| (VI') | quinoxaline-O-P(=S)(OC₂H₅)(C₆H₅) | 0.001 / 0.0001 | 100 / 75 |
| (VIII") | quinoxaline-O-P(=S)(OC₂H₅)(CH₃) | 0.001 / 0.0001 / 0.00001 | 100 / 100 / 70 |
| (IX") | benzotriazinone-N-CH₂-S-P(=S)(OC₂H₅)₂ | 0.001 / 0.0001 | 100 / 0 |

(Compound known from U.S. Patent specification No. 2,758,115.)

EXAMPLE 4

Boophilus test

Solvent: 3 parts by weight acetone
Emulsifier: 1 part by weight alkylaryl polyglycol ether.

To produce a suitable preparation of the particular active compound, 1 part by weight of the active compound is mixed with the stated amount of the solvent, the stated amount of emulsifier is added, and the concentrate diluted with water to the desired final concentration.

Ten female ticks (*Boophilus microplus*) are placed on a small cotton pad which is subsequently immersed in the preparation of the given active compound. After one minute, the cotton pad is removed from the solution and placed in a glass disc containing filter paper. The ticks are removed from the cotton pad and placed on dry filter paper. After the specified period of time, the degree of destruction is determined percentagewise: 100% indicates that all of the ticks are killed, whereas 0% indicates that none are killed.

The active compounds, their concentrations and the results obtained can be seen from the following Table 4:

TABLE 4.—PLANT DAMAGING INSECTS.

| Active compound | | Percent Concentration of active compound | Degree of destruction after 72 hours |
|---|---|---|---|
| (III''') | quinoxaline-O-P(=O)(OC₂H₅)₂ | 0.5 / 00.5 | 100 / 25 |
| (IV''') | quinoxaline-O-P(=S)(OC₂H₅)₂ | 0.0025 / 0.0005 | 100 / 50 |
| (V''') | quinoxaline-O-P(=S)(OC₂H₅)(C₂H₅) | 0.0005 / 0.00025 | 100 / 65 |

TABLE 4—Continued

| Active compound | Percent Concentration of active compound | Degree of destruction after 72 hours |
|---|---|---|
| (VI''') [quinoxaline-O-P(=S)(OC₂H₅)(C₆H₅)] | 0.001<br>0.00025 | 100<br>55 |
| (X) [quinoxaline-O-P(=S)(OCH₃)(OCH₃)] | 1.0 | 100 |
| (VII') [quinoxaline-O-P(=S)(OCH₃)(O-iso-C₃H₇)] | 0.0005<br>0.00025 | 100<br>50 |

EXAMPLE 4a

Drosophila test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

1 cc. of the preparation of the active compound is applied with a pipette to a filter paper disc of 7 cm. diameter. The wet disc is placed in a glass vessel containing 50 fruit flies (*Drosophila melanogaster*) and covered with a glass plate.

After the specified periods of time, the destruction is determined as a percentage: 100% means that all the flies are killed; 0% means that none are killed.

The active compounds, their concentrations, the evaluation times and the degree of destruction can be seen from the following table:

TABLE 4a.—PLANT DAMAGING INSECTS

| Active compound | Percent Concentration of active compound | Degree of destruction after 72 hours |
|---|---|---|
| (IX''') (C₂H₅O)₂P(=S)—S—CH₂—N [phthalazinone]<br>(Compound known from U.S. patent specification No. 2,758,115) | 0.1 | 0 |
| (III'''') quinoxaline-O-P(=O)(OC₂H₅)₂ | 0.1<br>0.01 | 100<br>100 |
| (IV'''') quinoxaline-O-P(=S)(OC₂H₅)₂ | 0.1<br>0.01<br>0.001 | 100<br>100<br>100 |

TABLE 4a—Continued

| Active compound | Percent Concentration of active compound | Degree of destruction after 72 hours |
|---|---|---|
| (VII'') [quinoxaline-O-P(=S)(OC₃H₇-iso)(OCH₃)] | 0.1<br>0.01 | 100<br>95 |
| (V''') [quinoxaline-O-P(=S)(OC₂H₅)(CH₃)] | 0.1<br>0.01 | 100<br>95 |
| (V'''') [quinoxaline-O-P(=S)(OC₂H₅)(C₂H₅)] | 0.1<br>0.01<br>0.001 | 100<br>100<br>100 |

The following examples are given for the purpose of illustrating the production process in accordance with the invention:

EXAMPLE 5

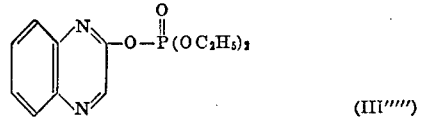

(III''''')

59 grams (0.4 mol) of 2-hydroxyquinoxaline are heated under reflux, together with an equimolar amount of dried, finely sieved potassium carbonate, in 350 ml. of acetonitrile for 15 minutes, while stirring, and 60 g. of O,O-diethyl-phosphoric acid ester chloride are subsequently added dropwise to the reaction mixture at 50 to 55° C.

The reaction mixture is stirred for a further 2 hours at 75° C., allowed to cool, mixed with 500 ml. of benzene and the soluble components are washed out by shaking several times with water. The organic phase which results is dried over sodium sulfate and the solvent evaporated under reduced pressure, finally using a so-called "partial distillation" at 70° C. and 0.1 mm. Hg.

In this way, 94 g. (83.5% of theory) of O,O-diethyl-phosphoric acid-O-[quinoxalyl-(2)] ester are obtained in the form of a yellowish oil which cannot be distilled without decomposition and which has the refractive index $n^D_{25}$ 1.5383.

*Analysis.*—Calcd. for $C_{12}H_{15}N_2O_4P$ (molecular weight 282.2) (percent): N, 9.92; P, 10.97. Found (percent): N, 10:15; P, 11.12.

EXAMPLE 6

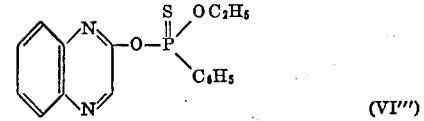

(VI''')

44 grams (0.3 mol) of 2-hydroxyquinoxaline are stirred with 750 ml. of dimethyl formamide and an equivalent amount of a methanolic sodium methylate solution is added to this mixture, which is then concentrated under reduced pressure to a volume of 200 ml.

The resultant solution is mixed dropwise at 60° C. with 66 g. of phenyl-thionophosphonic acid-O-ethyl ester chloride and subsequently further stirred at 75 to 80° C. for two hours. Working up of the reaction mixture as in Example 5 gives 85 g. (86% of theory) of phenyl-thionophosphonic acid-O-ethyl-O-[quinoxalyl-(2)] ester in the form of white crystals which melt at 142° C., after recrystallization from benzene/ligroin.

*Analysis.*—Calcd. for $C_{16}H_{15}N_2O_2PS$ (molecular weight 330.4) (percent): P, 9.39; S, 9.71. Found (percent): P, 9.75; S, 9.89.

EXAMPLE 7

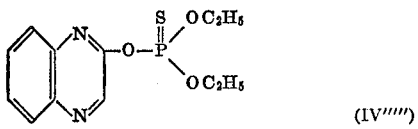
(IV''''')

51 grams (0.35 mol) of 2-hydroxyquinoxaline are stirred into 400 ml. of acetonitrile and briefly boiled with 36 g. of triethylamine. 66 grams of O,O-diethyl-thionophosphoric acid ester chloride are added dropwise to this mixture, which is subsequently stirred for a further two hours, while boiling under reflux. Working up of the reaction mixture is carried out in the manner described in Example 5. 85 grams (81.5% of theory) of O,O-diethyl-thionophosphoric acid-O-[quinoxalyl-(2)] ester are obtained in the form of a dark-yellow oil which has the refractive index $n^D{}_{25}$ 1.5624, and which decomposes when distilled. M.P. 35–36° C. (from ligroin).

*Analysis.*—Calcd. for $C_{12}H_{15}N_2O_3PS$ (molecular weight 298.3 (percent): P, 10.38; S, 10.75. Found (percent): P, 10.56; S, 10.75.

EXAMPLE 8

The following compounds of the general formula:

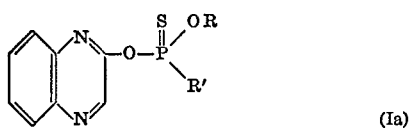
(Ia)

are obtained in a manner analogous to that described in Examples 5 to 7.

The compound, methyl-thionophosphonic acid-O-ethyl-O-[quinoxalyl-(2)] ester, has the formula

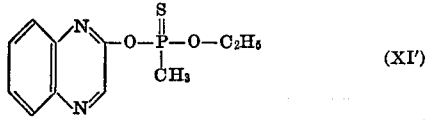
(XI')

The compound, ethyl-thionophosphonic acid - O - ethyl-O-[quinoxalyl-(2)] ester, has formula

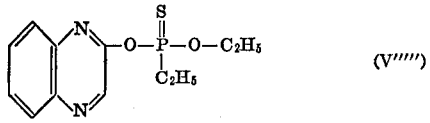
(V''''')

EXAMPLE 9

In the same manner, using corresponding molar amounts of 2-hydroxyquinoxaline and each of the following starting materials, respectively:

(a) O,O-di-n-propyl-phosphoric acid ester chloride;
(b) O,O-di-tert.-butyl-phosphoric acid ester chloride;
(c) O,O-diisopropyl-thionophosphoric acid ester chloride;
(d) O,O-di-sec.-butyl-thionophosphoric acid ester chloride;
(e) methyl-phosphonic acid-O-tert.-butyl ester chloride;
(f) isobutyl-phosphonic acid-O-n-propyl ester chloride;
(g) n-propyl-thionophosphonic acid-O-n-butyl ester chloride;
(h) sec.-butyl-thionophosphonic acid-O-isopropyl ester chloride;
(i) phenyl-phosphonic acid-O-methyl ester chloride;
(j) phenyl-phosphonic acid-O-tert.-butyl ester chloride;
(k) phenyl-thionophosphonic acid-O-isopropyl ester chloride;
(l) phenyl-thionophosphonic acid-O-n-butyl ester chloride;

| R | R' | Empirical formula | Molecular weight | Analysis, percent Calcd. P | Calcd. S | Found P | Found S | Yield, percent of theory | Physical constants $n_D{}^{25}$ |
|---|---|---|---|---|---|---|---|---|---|
| $CH_3$ (X') | $OCH_3$ | $C_{10}H_{11}N_2O_3PS$ | 270.2 | 11.46 | 11.87 | 11.73 | 12.60 | 71 | 1.5573 |
| 1-$C_3H_7$ (VII'''') | $OCH_3$ | $C_{12}H_{15}N_2O_3PS$ | 298.1 | 10.38 | 10.70 | 9.56 | 9.99 | 82 | 1.5603 |
| $C_2H_5$ (XI) | $CH_3$ | $C_{11}H_{13}N_2O_2PS$ | 268.2 | 11.60 | 11.90 | 13.10 | 13.40 | 69 | 1.5768 |
| $C_2H_5$ (V'''') | $C_2H_5$ | $C_{12}H_{15}N_2O_2PS$ | 282.3 | 10.90 | 11.36 | 11.7 | 11.25 | 78 | 1.5802 |

The compound, O,O-dimethyl-thionophosphoric acid-O-[quinoxalyl-(2)] ester, has the formula

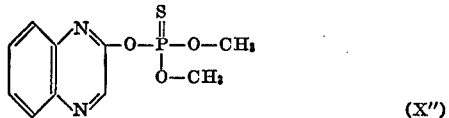
(X'')

The compound, O-methyl - O - isopropyl-thionophosphoric acid - O - [quinoxalyl-(2)] ester, has the formula

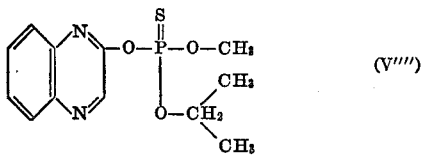
(V'''')

the particular phosphoric, thionophosphoric, phosphonic, and thionophosphonic acid esters, respectively, are formed:

(a') O,O-di-n-propyl-phosphoric acid-O-[quinoxalyl-(2)] ester;
(b') O,O-di-tert.-butyl-phosphoric acid-O-[quinoxalyl-(2)] ester;
(c') O,O-di-iso-propyl-thionophosphoric acid-O-[quinoxalyl-(2)] ester;
(d') O,O-di-sec.-butyl-thionophosphoric acid-O-[quinoxalyl-(2)] ester;
(e') methyl-phosphonic acid-O-tert.-butyl-O-[quinoxalyl-(2)] ester;
(f') iso-butyl-phosphonic acid-O-n-propyl-O-[quinoxalyl-(2)] ester;
(g') n-propyl-thionophosphonic acid-O-n-butyl-O-[quinoxalyl-(2)] ester;

(h') sec.-butyl-thionophosphonic acid-O-iso-propyl-O-[quinoxalyl-(2)] ester;
(i') phenyl-phosphonic acid-O-methyl-O-[quinoxalyl-(2)] ester;
(j') phenyl-phosphonic acid-O-tert.-butyl-O-[quinoxalyl-(2)] ester;
(k') phenyl-thionophosphonic acid-O-iso-propyl-O-[quinoxalyl-(2)] ester;
(l') phenyl-thionophosphonic acid-O-n-butyl-O-[quinoxalyl-(2)] ester.

It will be appreciated, in accordance with the present invention, that in the foregoing formulae:

R represents alkyl having 1 to 4 carbon atoms, such as methyl, ethyl, n-propyl, iso-propyl, n-butyl, iso-butyl, sec.-butyl, tert.-butyl, and particularly alkyl having 1 to 3 carbon atoms, i.e., methyl, ethyl, n-propyl, and iso-propyl;

R' represents alkyl having 1 to 4 carbon atoms, such as methyl to tert.-butyl, inclusive, i.e., the radicals specifically mentioned under R, and particularly alkyl having 1 to 3 carbon atoms, i.e., methyl, ethyl, n-propyl, and iso-propyl; lower alkoxy, such as methoxy, ethoxy, n-propoxy, iso-propoxy, n-butoxy, iso-butoxy, sec.-butoxy, tert.-butoxy, and the like, and particularly alkoxy having 1 to 3 carbon atoms, including methoxy, ethoxy, n-propoxy and iso-propoxy; or phenyl; and X represents oxygen or sulfur, preferably sulfur.

In accordance with a preferred feature of the invention, R is $C_1$-$C_3$ alkyl; R' is $C_1$-$C_3$ alkyl, $C_1$-$C_3$ alkoxy, or phenyl; and X is oxygen or sulfur, preferably sulfur.

Thus, the preferred subgeneric aspects of the present invention contemplate:

O,O-di($C_1$-$C_4$ alkyl) phosphoric acid - O - [quinoxalyl-(2)] ester having the formula

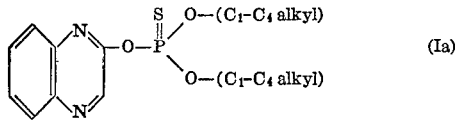
(Ia)

O,O-di($C_1$-$C_4$) alkyl-thionophosphoric acid-O-[quinoxaly-(2)] ester having the formula
$C_1$-$C_4$ alkyl-phosphonic acid-O-($C_1$-$C_4$ alkyl)-O-[quinoxalyl-(2)] ester having the formula

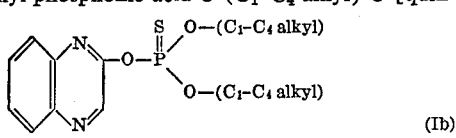
(Ib)

$C_1$-$C_4$ alkyl-phosphonic acid-O-($C_1$-$C_4$ alkyl)-O-[quinoxalyl-(2)] ester having the formula

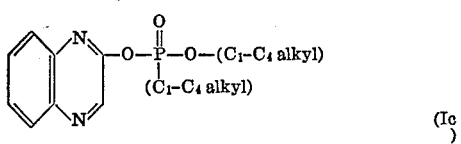
(Ic)

$C_1$-$C_4$ alkyl-thionophosphonic acid-O-($C_1$-$C_4$ alkyl)-O-[quinoxalyl-(2)] ester having the formula

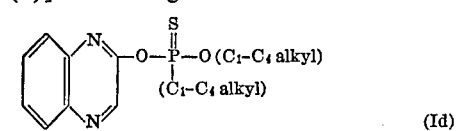
(Id)

Phenyl-phosphonic acid - O - ($C_1$-$C_4$ alkyl) - O - [quinoxalyl-(2)] ester having the formula

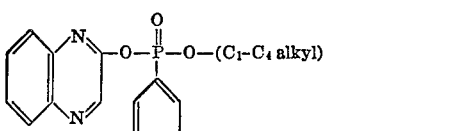
(Ie)

Phenyl-thionophosphonic acid - O - ($C_1$-$C_4$ alkyl)-O-[quinoxalyl-(2)] ester having the formula

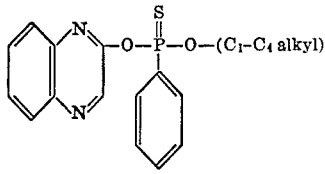
(If)

All of the foregoing compounds contemplated by the present invention possess the desired pesticidal, and especially insecticidal and acaricidal, activity, whereby the combating of pests, such as arthropods, may be attained effectively.

It will be appreciated that as contemplated herein, the terms "artropod," "arthropodicidal" and "arthropodicide" may be defined as encompassing specifically both insects and acarids within the comtemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in essence means an insecticidally or acaricidally effective amount of the active compound for the desired purpose.

It will be appreciated that the instant specification and examples are set forth by way of illustration and not limitation, and that various modifications and changes may be made without departing from the spirit and scope of the present invention.

What is claimed is:

1. A phosphorus-containing ester of 2-hydroxyquinoxaline having the formula

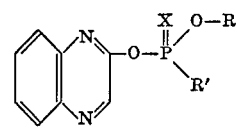

in which R is alkyl having 1 to 4 carbon atoms, R' is a member selected from the group consisting of alkyl having 1 to 4 carbon atoms, lower alkoxy having 1 to 4 carbon atoms, and phenyl, and X is selected from the group consisting of oxygen and sulfur.

2. An ester according to claim 1 wherein R is alkyl having 1 to 3 carbon atoms, R' is a member selected from the group consisting of alkyl having 1 to 3 carbon atoms, lower alkoxy having 1 to 3 carbon atoms, and phenyl, and X is sulfur.

3. An ester according to claim 1 wherein such compound is O,O-diethyl-phosphoric acid-O-[quinoxalyl-(2)] ester having the formula

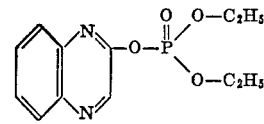

4. An ester according to claim 1 wherein such compound is O,O-diethyl - thionophosphoric acid - O - [quinoxalyl-(2)] ester having the formula

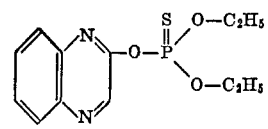

5. An ester according to claim 1 wherein such compound is ethyl-thionophosphonic acid-O-ethyl-O-[quinoxalyl-(2)] ester having the formula

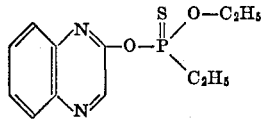

6. An ester according to claim 1 wherein such compound is phenyl-thionophosphonic acid-O-ethyl-O-[quinoxalyl-(2)]ester having the formula

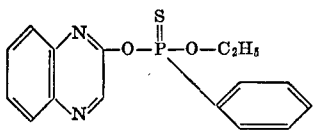

7. An ester according to claim 1 wherein such compound is O,O-dimethyl-thionophosphoric acid-O-[quinoxalyl-(2)] ester having the formula

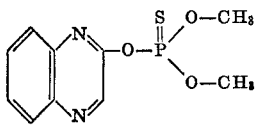

8. An ester according to claim 1 wherein such compound is O-methyl-O-iso-propyl-thionophosphoric acid-O-[quinoxalyl-(2)] ester having the formula

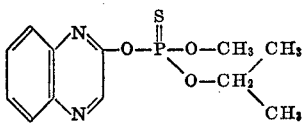

9. An ester according to claim 1 wherein such compound is methyl-thionophosphonic acid-O-ethyl-O-[quinoxalyl-(2)] ester having the formula

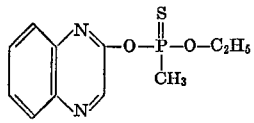

10. A compound of the formula

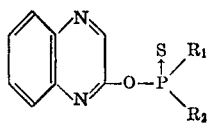

wherein $R_1$ and $R_2$ are selected from the group consisting of alkoxy radicals of up to 4 carbon atoms.

References Cited
UNITED STATES PATENTS

| | | | |
|---|---|---|---|
| 3,150,149 | 9/1964 | Uhlenbroek et al. | 260—310 |
| 3,172,888 | 3/1965 | Miller et al. | 260—250 |
| 3,216,894 | 11/1965 | Lorenz et al. | 260—250 |
| 3,340,262 | 9/1967 | Gagliardi et al. | 260—250 |

ALEX MAZEL, Primary Examiner

R. V. RUSH, Assistant Examiner

U.S. Cl. X.R.

424—250

UNITED STATES PATENT OFFICE
CERTIFICATE OF CORRECTION

Patent No. 3,763,160          Dated October 2, 1973

Inventor(s) Karl-Julius Schmidt et al

It is certified that error appears in the above-identified patent and that said Letters Patent are hereby corrected as shown below:

Col. 3, line 67, correct spelling of "scab".
Col. 6, line 20, change "2,758,135" to -- 2,758,115 --.
Col. 7, line 31, correct spelling of "test".
Col. 8, line 13 in the Table, change "0.001" (second occurrence) to -- 0.0001 --.

Col. 13, line 37, correct formula (I) as follows: change
"$\underset{\underset{P}{\|}}{S}$" to -- $\underset{\underset{P}{\|}}{O}$ --.

Col. 13 ------- delete line 44.

Signed and sealed this 24th day of September 1974.

(SEAL)
Attest:

McCOY M. GIBSON JR.
Attesting Officer

C. MARSHALL DANN
Commissioner of Patents